May 13, 1924.

A. J. LINDER

FLEXIBLE FASTENER FOR BELTS

Filed March 14, 1921

Andrew J. Linder
INVENTOR

BY Ridny Slough + Tules,

His ATTORNEYS.

May 13, 1924.
A. J. LINDER
1,493,684
FLEXIBLE FASTENER FOR BELTS
Filed March 14, 1921      2 Sheets-Sheet 2
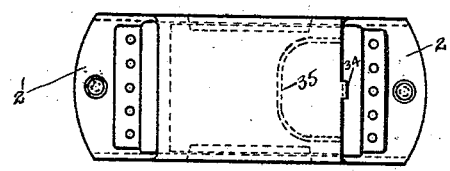
Fig 6
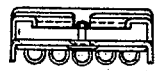
Fig 7         Fig 8
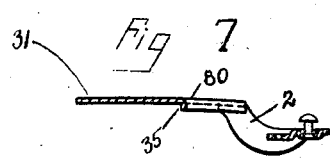
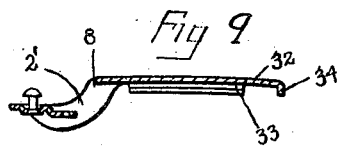
Fig 9         Fig 11
Fig 10
*Andrew J. Linder*
INVENTOR.
BY *Richey Slough + Tates*
ATTORNEY.

Patented May 13, 1924.

1,493,684

UNITED STATES PATENT OFFICE.

ANDREW J. LINDER, OF ELYRIA, OHIO.

FLEXIBLE FASTENER FOR BELTS.

Application filed March 14, 1921. Serial No. 452,099.

*To all whom it may concern:*

Be it known that I, ANDREW J. LINDER, a citizen of the United States, residing at Elyria, in the county of Lorain and State of Ohio, have invented certain new and useful Improvements in Flexible Fasteners for Belts; and I do hereby declare the following to be a full, clear, concise, and exact description of the invention, such as will enable those skilled in the art to which it appertains to make and use the same.

My invention relates to improvements in flexible fasteners for belts or girdles.

It is an object of my invention to provide such a flexible fastener, serving both as a belt buckle and as a flexible section in the belt, whereby the united portions of the belt may be yieldingly held by the fastener, a spring tension always being exerted to keep the belt strap ends closely together, but allowing them to separate, as when the wearer takes a deep breath or stoops, or causes the belt to tend to expand from any other cause.

Another object of my invention is to provide a composite belt comprising a spring element combination, which will be hidden from view during the wear of the belt, and it is furthermore a part of my invention to provide a structure wherein the leather belt strap loose end is held closely to the underlying belt fastener portions, so as to present a neat appearance, and at the same time said belt strap end retaining members being of finished and ornamental appearance.

It is a further object of my invention to provide a structure of the aforesaid character, which may be readily applied to belt straps as ordinarily made without buckles, or by removing the ordinary buckles provided.

Another object of my invention is to provide a composite belt comprising such a fastener of the character described, which will be durable, and at the same time inexpensive to manufacture.

Other objects of my invention and the invention itself will be better understood by reference to the drawings, in which—

Fig. 6 shows a plan view of a second embodiment of my invention, the springs 11 being omitted.

Fig. 7 shows a side elevation of the embodiment illustrated in Fig. 6.

Fig. 8 shows an end elevation of the said embodiment.

Fig. 9 shows a longitudinal section of an end plate member comprised in the said embodiment.

Fig. 10 shows a longitudinal section of the other end plate member of the said embodiment.

Fig. 11 shows a stud or tongue, one of which is mounted on each end plate member.

Figure 4:
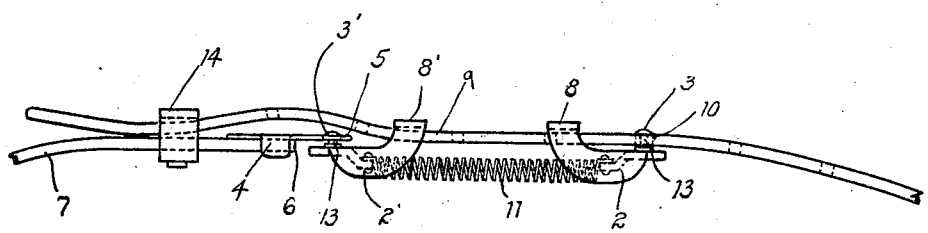
Fig. 4 shows a side view of the said fastener in use, yieldingly securing the ends of a belt together.
Figure 5:
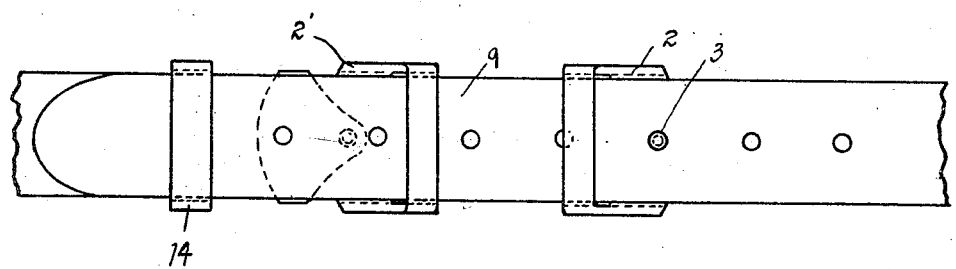
Fig. 5 shows a plan view taken from the front of a portion of the belt and the belt fastener illustrated in Fig. 4.
Figure 1:
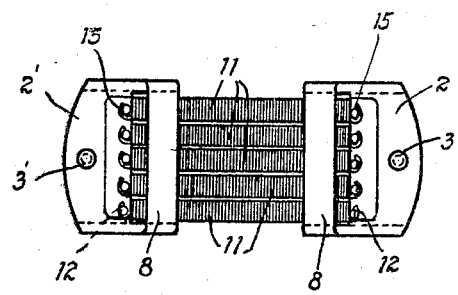
Fig. 1 shows a front plan view of a belt fastener embodying my invention.
Figure 3:
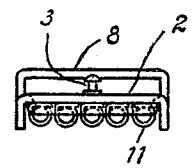
Fig. 3 shows an end elevation.

Referring now to the figures, in all of which like parts are designated by like reference characters, at 2 I show an end plate, said end plate having mounted thereon a tongue 3 projecting above the surface of the said plate, said tongue being adapted to project through the ordinary perforations provided at intervals in belt straps for the purpose of adjusting the belts. A like member 2' having a like tongue 3' is provided for securing the other end of the strap, which may be accomplished in like manner by providing a perforation through the other end of the strap, or, as illustrated, providing a grip member, shown at 4, for the other end, and frictionally secured therewith, said grip member having an extension perforated at 5 extending beyond the end 6 of the strap 7, said perforation 5 being adapted to operate as an eye to be snapped over the tongue 3' of the frame member 2'.

Figure 2:
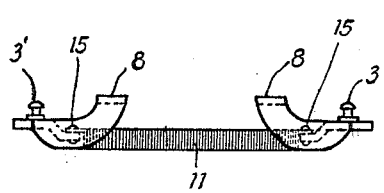
Fig. 2 shows the fastener viewed from a side thereof.

The frame members 2 and 2' have upwardly and forwardly extending loop portions 8 and 8', which are adapted to overlie the loose end 9 of the strap, which is secured by an opening therethrough at 10 to the tongue 3, and which loose end passes under the said loop portions 8 and 8'. Connecting the belt plates 2 and 2' are a plurality of flexible spring coils 11, said spring coils being secured at either end, as at 12, to the said plates 2 and 2' in any suitable manner, such as by soldering, or, as illustrated in the figure, by being secured under the heads of small rivets which pass through perforations extending through the depressed tongues 15 of the members 2 and 2'. The tongues 15 being offset from the body portion of the members 2 and 2' insure that the springs 11 will lie, as viewed in Figs. 2 and 4, below the plane of the securing tongues 3 and 3' mounted on these plates.

The tongues 3 and 3' have preferably enlarged head portions and lower (as seen in Fig. 4) neck portions, said neck portions being shown at 13. As best shown in Fig. 4, it will be seen that the said neck portions, which are adapted to be embraced by the perforations, as 10, of the strap, are located in a plane substantially above (as seen in Fig. 4) the spring coils 11, and therefore, the strap end 9 will lie flat under the ornamental loops 8 throughout the length of the fastener, and may pass under a loop 14 of leather or the like riveted to the strap 7, to secure the extreme end of the belt end portion 9.

It will thus be seen that my improved fastener provides a straight passageway for the free end of the strap, whereby the said belt end presents a neat appearance, and at the same time, hides the springs 11, the spring ends 12 and the other portions of the fastening mechanism located to the rear of the said strap free end.

Referring now to the embodiment illustrated in Figs. 6 to 11 inclusive, I show in these figures a second embodiment of my invention, wherein the portions 80 of each end plate are extended to form telescoping portions 31 and 32, the portion 31 being in the nature of a slide plate fitting within a groove 32 in the extended portion 33 of the plate 2'. By this arrangement I am enabled to cause the end plates to which the springs are secured to act as a cover for the strap end 9, and the surface of this metallic cover may be ornamented, as by engraving initials thereon, or in any other suitable way. It will be noted also that this embodiment provides a very straight passageway for the end 9 of the strap, the disposition of the springs 11, the tongues 30 and the portions 31 and 32 of the end plates being so arranged as to produce such a passageway, so that unsightly bending or other distortion of the belt will be obviated.

The stud tongues 30, it will be noted by referring to the figures, rest upon depressions in the end plates. I provide a catch tongue 34 on the end of the portion 32 of the plate 2', which is adapted to register with an edge 35 of a slot in the end of the portion 31, so as to prevent undue separation of the telescoping end plates.

Having thus described my invention, I wish it to be understood that I am aware that numerous and extensive departures may be made from the embodiment of my invention herein illustrated, but without departing from the spirit of my invention.

What I claim is:

1. A composite elastic belt comprising a belt strap, a fastener for the ends thereof, said fastener comprising a pair of end plates, a short elastic fastener section connecting the end plates and disposed intermediate thereof, an end of the said strap secured to the outer face of one of said plates, the other strap end secured to the outer face of the other plate and having a portion projecting beyond the said plate, and over the outer face thereof, and a strap retaining element adapted to hold the projecting strap end close to the underlying said elastic section, said retaining element being integral with one of said plates and looped over the outer face of the strap end.

2. A composite elastic belt comprising a belt strap, a fastener for the ends thereof, said fastener comprising a pair of end plates, a short elastic fastener section connecting the end plates and disposed intermediate thereof, an end of the said strap secured to the outer face of one of said plates, the other strap end secured to the outer face of the other plate and having a portion projecting beyond the said plate, and over the outer face thereof, and a pair of strap retaining elements each integral with one of said plates and looped therefrom over the outer face of the projecting strap end.

3. A composite elastic belt comprising a belt strap, a fastener for the ends thereof, said fastener comprising a pair of end plates, a short elastic fastener section connecting the end plates and disposed intermediate thereof, an end of the said strap secured to the outer face of one of said plates, the other strap end secured to the outer face of the other plate and having a portion projecting beyond the said plate, and over the outer face thereof, and a strap retaining element adapted to hold the projecting strap end close to the underlying said elastic section, said retaining element being integral with one of said plates and looped over the outer face of the strap end, one of said retaining elements telescoping within a longitudinal slide-way in the other element, said telescoped elements concealing the outer face of the underlying strap end.

In witness whereof, I have hereunto signed my name this 11th day of March, 1921.

ANDREW J. LINDER.